US011644210B1

(12) United States Patent
Rosner et al.

(10) Patent No.: US 11,644,210 B1
(45) Date of Patent: May 9, 2023

(54) POWER SHIFT SYSTEM TO STORE AND DISTRIBUTE ENERGY WITH DIRECT COMPRESSOR DRIVE

(71) Applicant: Kepler Energy Systems, Inc., West Sacramento, CA (US)

(72) Inventors: Brett D. Rosner, Granite Bay, CA (US); Greg Treseder, Folsom, CA (US); Michelle C Lau, West Sacramento, CA (US)

(73) Assignee: Kepler Energy Systems, Inc., West Sacramento, CA (US)

( * ) Notice: Subject to any disclaimer, the term of this patent is extended or adjusted under 35 U.S.C. 154(b) by 0 days.

(21) Appl. No.: 17/819,622

(22) Filed: Aug. 13, 2022

Related U.S. Application Data

(63) Continuation of application No. 17/566,682, filed on Dec. 31, 2021.

(51) Int. Cl.
  *F24F 11/62* (2018.01)
  *G06Q 50/06* (2012.01)
  (Continued)

(52) U.S. Cl.
  CPC ............ *F24F 11/62* (2018.01); *F24F 11/30* (2018.01); *G06Q 50/06* (2013.01); *H02J 3/008* (2013.01);
  (Continued)

(58) Field of Classification Search
  None
  See application file for complete search history.

(56) References Cited

U.S. PATENT DOCUMENTS 4,281,256 A * 7/1981 Ahrens ..................... F02C 6/16
                                                     290/1 R
4,765,142 A * 8/1988 Nakhamkin ............ F02C 6/003
                                                     60/659
(Continued)

OTHER PUBLICATIONS

Succar et al., "Compressed Air Energy Storage: Theory, Resources, And Applications For Wind Power", Apr. 2008, Princeton Environmental Institute, Princeton University. (Year: 2008).*

(Continued)

*Primary Examiner* — Mohammad Ali
*Assistant Examiner* — Kelvin Booker
(74) *Attorney, Agent, or Firm* — Michelle C. Lan

(57) ABSTRACT

Disclosed is a machine learning energy management system that regulates incoming energy sources into compressed air storage operations and energy generation. Compressed air is directed into a thermoregulation system that cycles storage tanks according to physical qualities. A boost impulse creates energy to initiate the electrical energy generation. The compressed air operations and energy generation leverage the heating and cooling of an external HVAC system to improve performance and conservation of the heating and cooling for an external building, wherein compressed air is used to drive a coolant compressor. The system combines real-time data, historical performance data, algorithm control, variable air pressure for demand-based generation, tank-to-tank thermal cycling, building air heat exchanger, and boost pulsation to achieve optimized system efficiency and responsiveness.

20 Claims, 12 Drawing Sheets

(51) Int. Cl.
*H02J 3/00* (2006.01)
*H02J 3/38* (2006.01)
*F24F 11/30* (2018.01)
*F02C 6/16* (2006.01)
*F02C 6/14* (2006.01)
*F01K 3/00* (2006.01)

(52) U.S. Cl.
CPC ............... *H02J 3/381* (2013.01); *F01K 3/00* (2013.01); *F02C 6/14* (2013.01); *F02C 6/16* (2013.01)

(56) References Cited

U.S. PATENT DOCUMENTS

| | | | | | |
|---|---|---|---|---|---|
| 7,281,371 | B1* | 10/2007 | Heidenreich | ........... | F03B 13/06 60/398 |
| 7,614,237 | B2* | 11/2009 | Nakhamkin | ............. | F02C 6/14 60/727 |
| 9,938,896 | B2* | 4/2018 | Bannari | ................ | F28F 21/083 |
| 10,415,431 | B2* | 9/2019 | Kavehpour | ............. | F01K 13/02 |
| 10,655,505 | B2* | 5/2020 | Matsukuma | ............... | F02C 1/04 |
| 2010/0043437 | A1* | 2/2010 | Nakhamkin | ............... | F02C 6/16 60/645 |
| 2013/0263585 | A1* | 10/2013 | Oppenheimer | ........... | F02C 6/16 60/398 |
| 2015/0267612 | A1* | 9/2015 | Bannari | .................... | F02C 6/16 60/659 |
| 2016/0326958 | A1* | 11/2016 | Kosamana | ................ | F02C 6/16 |
| 2017/0350318 | A1* | 12/2017 | Williams | .................. | F02C 3/04 |
| 2018/0238196 | A1* | 8/2018 | Kavehpour | ......... | F28D 20/0056 |
| 2018/0238304 | A1* | 8/2018 | Umez-Eronini | ........ | F03D 9/257 |
| 2019/0003384 | A1* | 1/2019 | Bannari | .................... | F01K 3/00 |
| 2019/0063316 | A1* | 2/2019 | Blount | ..................... | F02C 6/06 |
| 2019/0064757 | A1* | 2/2019 | Ramamurthy | ........ | H02J 15/003 |
| 2019/0234305 | A1* | 8/2019 | Ramamurthy | ... | G06Q 10/06314 |
| 2019/0376490 | A1* | 12/2019 | Pickett | ...................... | F03D 9/28 |
| 2019/0390599 | A1* | 12/2019 | Matsukuma | .............. | F02C 9/24 |
| 2020/0083743 | A1* | 3/2020 | Sato | ........................ | H02J 15/006 |
| 2020/0325891 | A1* | 10/2020 | Sato | ..................... | F01C 11/002 |
| 2022/0196341 | A1* | 6/2022 | Young | ..................... | B65G 5/00 |

OTHER PUBLICATIONS

Sadeghi et al., "Prefeasibility techno-economic assessment of a hybrid power plant with photovoltaic, fuel cell and Compressed Air Energy Storage (CAES)", Aug. 2018, Energy 168 (2019) 409e424. (Year: 2018).*

Rouindej et al., "CAES by design: A user-centered approach to designing Compressed Air Energy Storage (CAES) systems for future electrical grid: A case study for Ontario", 2019, Sustainable Energy Technologies and Assessments 35 (2019) 58-72. (Year: 2019).*

* cited by examiner

POWER SHIFT SYSTEM TO STORE AND DISTRIBUTE ENERGY WITH DIRECT COMPRESSOR DRIVE

CROSS-REFERENCE TO RELATED APPLICATIONS

This application claims the benefit of and is a continuation of U.S. Patent Application entitled "Power Shift System to Store and Distribute Energy," having Ser. No. 17/566,682, filed Dec. 31, 2021, and currently pending, which is incorporated by reference in its entirety as if fully set forth herein.

FIELD OF THE INVENTION

The present invention generally relates to reduction of greenhouse gas emissions, related to energy generation, transmission, and distribution. More specifically, the present invention is a machine-learning management system that controls the collection of renewable resources and low-peak energy and determines when to transmit energy for direct usage or store as compressed air. The system also determines the generation of energy from stored compressed air and controls the distribution of energy according to forecasted data and predicted demand. The present invention enables the reduction of greenhouse gas emission by increasing the application of renewable energy and reduction of renewable resource curtailment.

BACKGROUND OF THE INVENTION

There is a critical need for safe and reliable power and an increased global commitment to a carbon-free future. With the majority of the world's electricity generated from fossil fuels, a global trend has emerged towards a more thoughtful usage of power generation. Primary historic sources of electricity—oil, gas, coal, and nuclear—are derived from non-renewable technologies. Renewable technologies, such as solar and wind, generate electricity on an intermittent and unpredictable basis. While demand for electricity is predictable on a daily basis, supply of electricity produced from renewable energy does not match daily demand, resulting in heavy reliance on non-renewable technologies that are not environmentally sustainable and often include older generation natural gas-fired plants that produce high rates of greenhouse gases.

FIG. 1 shows the collection of solar and wind energy over a 24-hour period on Mar. 6, 2018, reported by the California Independent System Operators. The wind energy reported is almost negligible throughout the full period, and the solar energy is reported to be most available between the hours of 8 am and 4 pm with negligible availability outside this timeframe. Due to the growth of solar energy production, the peak energy demand has shifted to later in the day, causing further issues with solar over-generation in California.

The world's demand for power does not consider the availability of the source and, hence, the availability of energy from renewable resources does not naturally match the demand schedule for power. FIG. 2 illustrates the demand curve over a 24-hour period and also illustrates the net demand curve of the resulting energy demand after applying the energy provided by solar and wind. The net demand curve essentially reflects the amount of non-renewable power required to meet the net energy demand.

During the periods of surplus energy, the overproduction of energy from renewable resources must be backed off in curtailment to ensure that the supply and demand remain in balance. This curtailment results in a massive waste of resources from both the overproduction and from the curtailment of unusable renewable energy. Unforeseen imbalances between scheduled supply and actual production are heavily penalized due to the supply deviation from its committed schedule in the power markets. In 2017, California alone reports having to curtail 379,510 MWH of overproduction in order to maintain system supply and demand balance or system frequency. FIG. 3 shows the California ISO's historical curtailment of renewable resources from 2014 through 2017.

This problem of imbalance can be mitigated by storing energy when it is at a surplus and applying it to a later time period of peak demand when there are insufficient renewable sources. This would smooth out the incongruity of the supply and demand curves to reach a more balanced system, tailoring the supply to a scheduled demand as shown in FIG. 4. Not only would this prevent curtailments of wasting and disposing of power, it would also minimize commercial contracting for the heightened prices of energy during those peak periods.

Existing short-term storage technologies, while viable, suffer from a variety of shortcomings that limit their widespread use across a utility grid, especially for residential, small commercial, and micro-grid applications. Existing storage technologies include rechargeable batteries (lithium and lead-acid), flow batteries, inertial (flywheel), pumped water, gravitational potential energy, and traditional compressed air energy storage systems, all having shortcomings of high initial material acquisition and lifecycle costs, high infrastructure costs, low energy density, low or no portability, and potentially high end-of-life disposal costs, especially for battery-based storage. Lithium-based energy storage cannot easily respond to the afternoon energy demand ramp, and therefore is often still dependent on natural gas energy plants. Older, dirtier plants must be kept online to meet this demand and pump storage is utility scale, not small scale, and therefore requires complex site planning and costly development.

Compressed air energy storage (CAES) is a proven technology with currently operating plants of various sizes but has widely recognized shortcomings based on the mechanical losses of the system and fundamentals of thermal inefficiency during the compression and expansion processes. In traditional systems, excess or off-peak power is used to spin a chain of air compressors that force high-pressure air into tanks. Compression creates heat that is either stored adiabatically in an enormous thermal mass or dissipated diabatically into the environment. When energy demand is high, compressed air is released from the tanks at a regulated pressure. The released air spins an air motor expander and generator to feed electricity back into either a utility grid or a micro-grid. Expansion removes heat from the compressed air, which will approach inefficient or potentially damaging cryogenic temperatures. Consequently, the air must be warmed during the expansion process. An adiabatic process warms the air with heat stored during the compression process. A diabatic process reheats the air with a gas fired burner or other heat source, consuming non-renewable energy that creates greenhouse gases. Large-scale CAES plants of at least 100 MWh storage capacity use underground caverns for compressed air storage, relying on gas-fired burner or heat from gas-fired plants. Additionally, since a CAES system uses mechanical components by design, mechanical losses due to friction, inertia, and component design are unavoidable.

Further, traditional CAES systems can convert the compressed air to electrical energy using an air driven generator, using this electrical energy to operate various systems including coolant systems. However, these systems can take considerable energy and the losses associated with converting the compressed air to electrical energy and then using this energy to drive a coolant compressor can be substantial.

A CAES system that could overcome thermal and mechanical inefficiencies would have broad application for both residential and commercial micro-grids.

SUMMARY OF THE INVENTION

Disclosed is a machine-learning energy management system that controls energy capture, air compression, storage, and electrical energy generation and distribution to provide safe, reliable, efficient energy from intermittent and off-peak sources for individual demand. The present invention harnesses energy from renewable sources and from a public utility grid during low demand and low price periods and converts the energy to compressed air, which is stored for later usage. The compressed air is converted to electrical energy and distributed using a continuum of optimal operating parameters that enable peak demands of daily commercial and residential usage to be met by shifting energy to times of required demand and to times when direct renewable energy sources are not available. The compressed air is also used to drive an external coolant system, directly driving the coolant compressor to realize even greater system efficiency. The present invention creates grid resiliency and independence by harnessing, storing, and distributing power on a microsystem level according to specific individual demand on a micro-grid kilowatt residential and commercial scale, also reducing curtailment of excess renewable energy.

The disclosed energy management machine comprises a system to manage capture of renewable energy and grid energy, determining when excess renewable energy is available and considering current and anticipated supply and demand, current and anticipated energy costs, current and forecasted weather, curtailment data, and historical system performance. The system converts excess renewable energy to stored energy in the form of compressed air, using a continuous cycling of storage tanks and a boost impulse to minimize efficiency losses due to heat of compression. The system also captures waste heat from the compression process and transfers the heat to an HVAC (heating, ventilating, air conditioning) system for use in heating an external building. The system determines when to convert compressed air to electrical energy considering overall supply and demand factors, further controlling the release of compressed air to power an air motor that is mechanically coupled to a generator using controlled thermal environmental heating to offset operational cooling. The system captures remaining expansive cooling energy and transfers it to the HVAC system to also cool the building. The system converts mechanical rotation to electrical power and controls an electrical system to feed that electrical power onto an electrical grid as a source of generated electricity. The system also uses compressed air to directly drive a coolant compressor, bypassing the conversion to electrical energy to increase system efficiency. When capturing energy from a wind source, the system shifts the input to a mechanically-coupled transmission to convey rotational energy from the wind vanes directly to the compression system to improve overall system efficiency.

The present invention advances the technology of existing, large-scale, reliable CAES technologies by enabling a scalable system that leverages proven reliability of a traditional system with an innovative isothermal process that harnesses heat from the surrounding environment to warm the air, significantly increasing system efficiency and reliability while minimizing complexity. The present invention does not rely on fossil fuels, instead using engineering innovations to minimize thermal inefficiencies, increase overall efficiency, and minimize total lifecycle costs with none of the environmental justice concerns of lithium technologies, either in raw materials acquisition or in end-of-life disposal. The present invention provides a customer side of the meter solution with increased cycle performance and critical energy needs, including resiliency, reliability, improved safety, lower environmental impact, lower costs than currently fielded systems, and better long term and lifecycle performance.

The present invention has widespread residential, commercial, and industrial applications, while creating a grid independence opportunity that minimizes the impact of utility shutdowns. The present invention also brings power to isolated areas that are currently unreachable by utility services and enables an integrated system for larger industrial and agricultural megawatt scale applications.

BRIEF DESCRIPTION OF THE DRAWINGS

The foregoing summary, as well as the following detailed description of preferred embodiments of the invention, will become better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Figure 1:
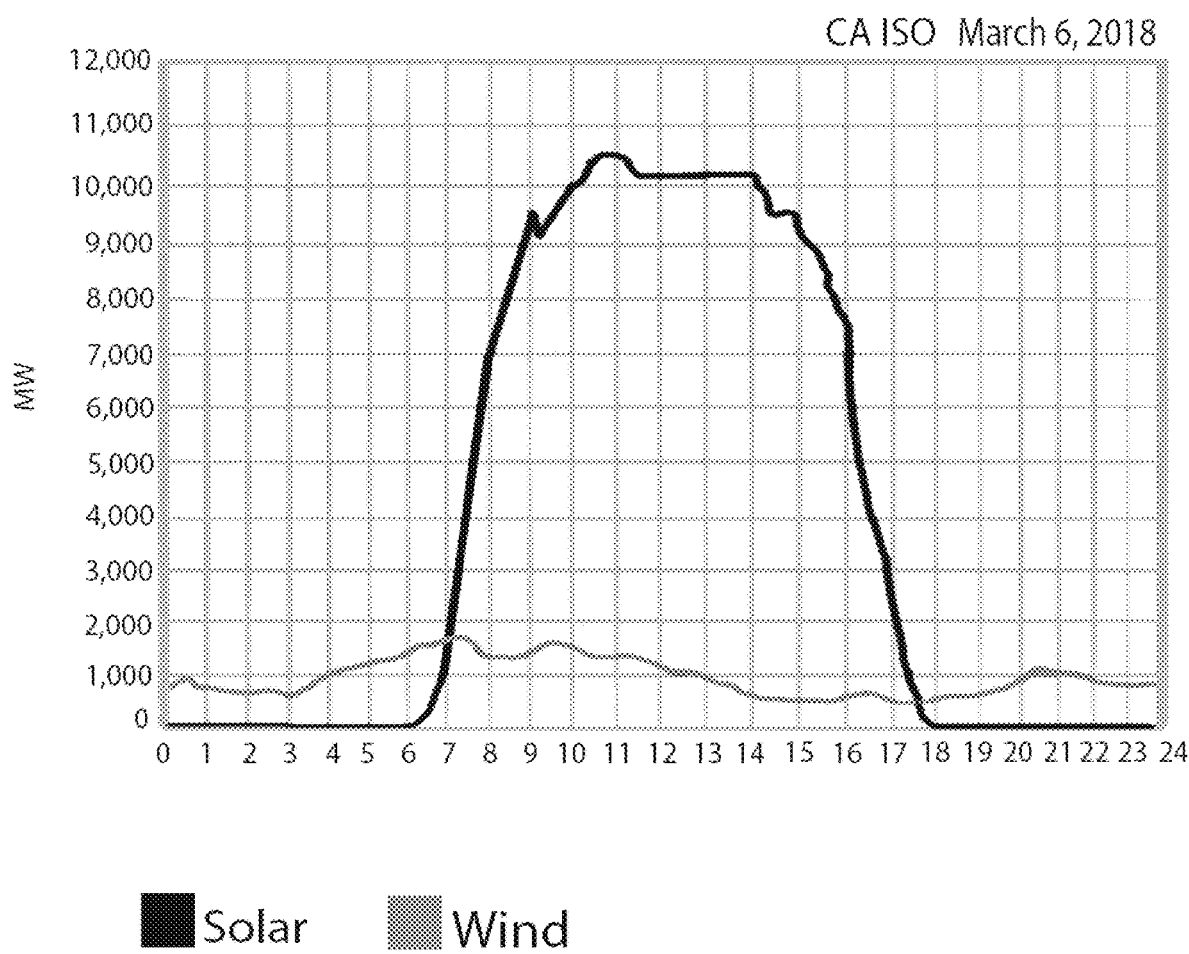
FIG. 1 illustrates the typical collection of solar and wind energy over a 24-hour period on Mar. 6, 2018, reported by the California ISO.
Figure 2:
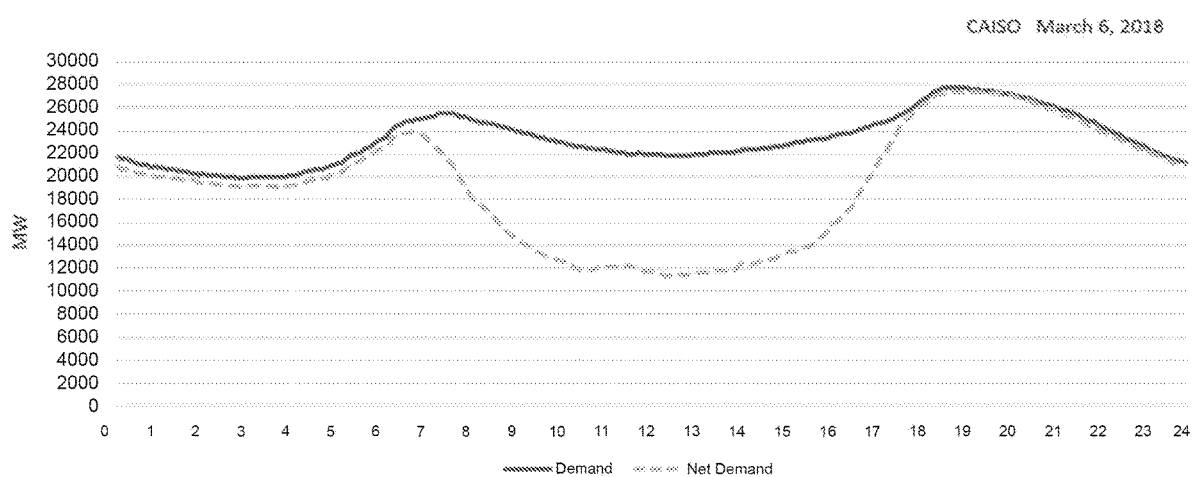
FIG. 2 illustrates the typical demand curve over a 24-hour period and the net demand curve of resulting energy demand after applying the energy provided by solar and wind.
Figure 3:
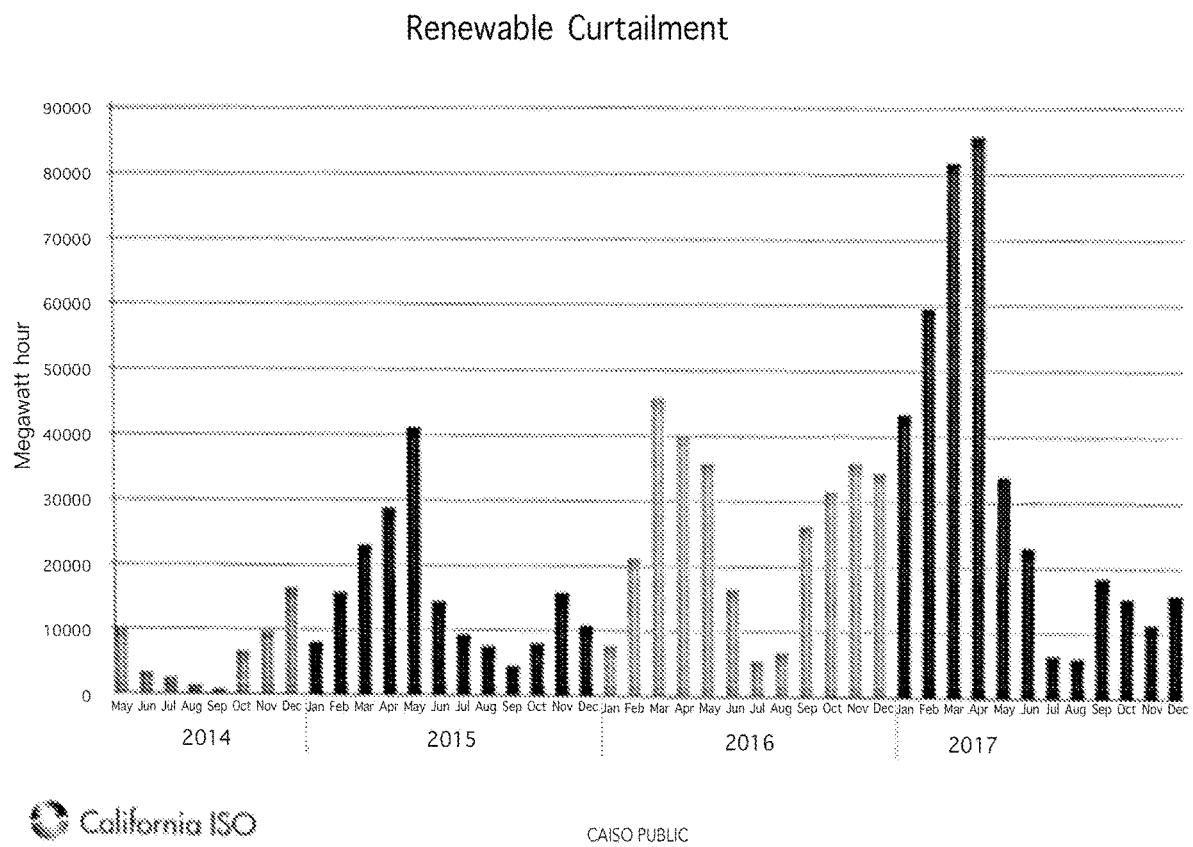
FIG. 3 illustrates the California ISO's typical historical curtailment of renewable resources from 2014 through 2017.
Figure 4:
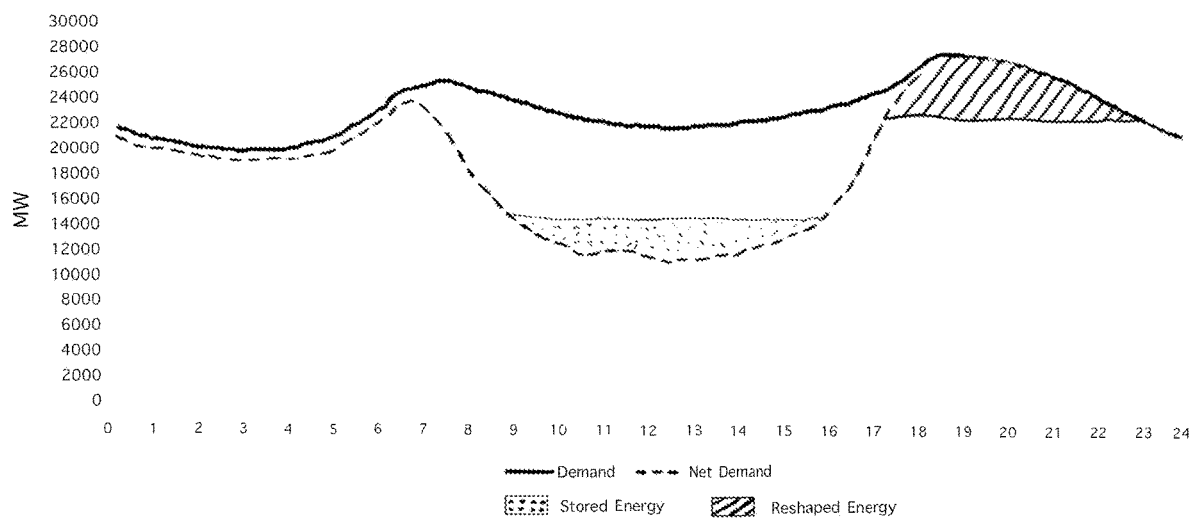
FIG. 4 illustrates Application of Stored Energy to Demand Curve.
Figure 5:
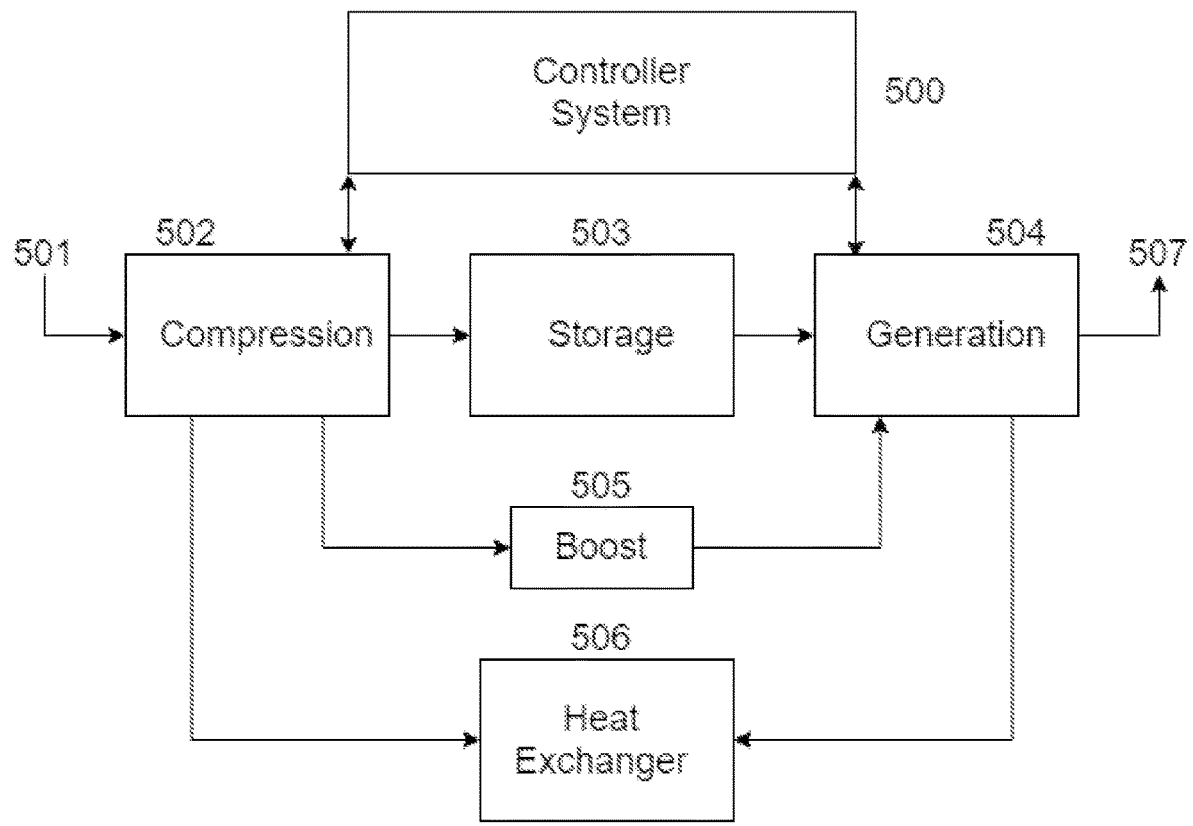
FIG. 5 illustrates the System Diagram.

As illustrated in FIG. 5, the present energy management machine uses a controller system 500 to manage incoming energy sources 501 into compressed air operations 502 and energy generation 504. Compressed air is regulated to feed into a cycling system of storage tanks 503 according to temperature and also generates boost pulsation 505 to create energy for kick-starting the mechanical components of the energy generation. Both the compressed air operations and energy generation have controlled outlets to a heat exchanger 506 that is connected to an HVAC system of an external building to leverage the heating and cooling of the system to improve performance and conservation of the HVAC operations for the building. The controller system 500 can also use compressed air 502 to directly drive the coolant compressor in order to increase the efficiency of the system either independently or in combination with the heat exchanger 506. Energy generation is exported to an electric utility grid 507. The system combines near real time web-based data, historical performance data, algorithm control method, variable air pressure for demand-based generation, thermal tank cycling, building air heat exchanger, and boost pulsation to continually calculate and analyze optimal operating parameters that enable optimized system efficiency and responsiveness. These engineering innovations represent a significant advancement and evolution over the systems currently interconnected with grid power systems.

System Operation Flow

Figure 6:
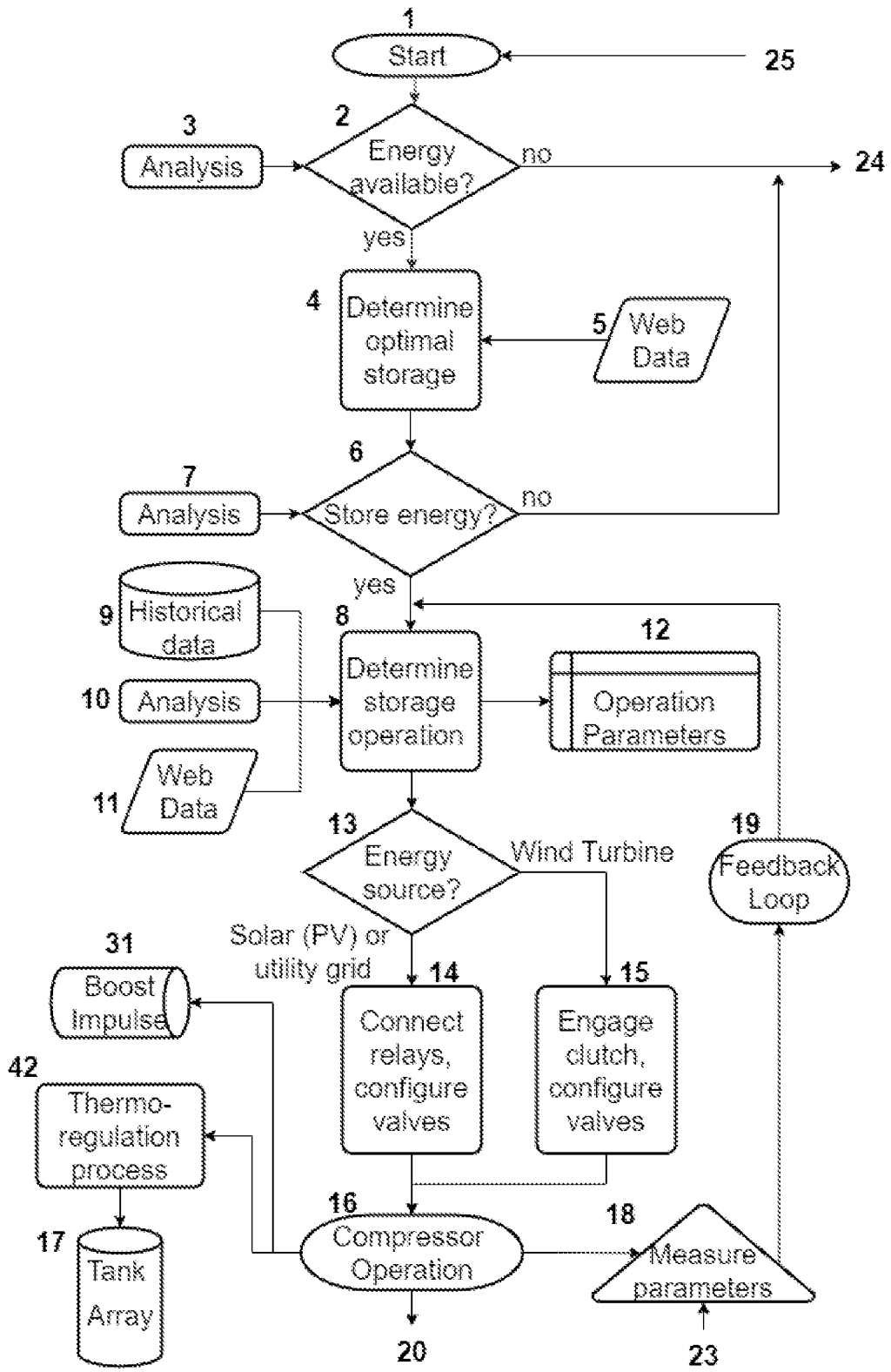
FIG. 6 illustrates the Operation Flow, Part 1.

The present invention begins with the flow illustrated in FIG. 6. The system operation runs in a continuous loop consisting of a series of decisions and processes. At the start 1, the system determines 2 whether to store energy, generate energy, or do nothing, and commands the controller appropriately when there is excess energy available from difference energy sources that include utility grid, a solar cell, or a wind turbine using results from CPU Analysis 3. When excess energy is available or when energy is determined to be at a desirable low cost, the system executes its storage process via the controller using the available excess energy to spin an electric motor connected to an air compressor. The system uses web data 5 to calculate upcoming energy demand, determine optimal storage 4, and determine 7 when energy should be stored 6. Once it is determined that energy is to be stored, the CPU runs 8 a Proportional-Integral-Derivative (PID) algorithm using historical performance data 9, CPU analysis 10, and internet data 11 to determine the energy source 13 and storage operation parameters 12.

When capturing energy from a wind source, the system shifts 15 the input to a mechanically-coupled transmission to convey rotational energy from the wind vanes directly to the compression operations, bypassing the wind electrical generator and the compressor electrical motor and therefore bypassing the losses that would exist between those components. There is a mechanical clutch between the wind turbine and the compressor that is engaged to directly spin the compressor, the tank outlet valves are closed, and the tank fill valves are opened. For the utility grid or solar source selection 14, the power relays are closed, the tank outlet valves are closed, and the appropriate tank fill valve is opened.

The compressor draws outside ambient air into its compression chambers, compresses it to a higher pressure, and transfers 16 that high-pressure air into a cycling array of storage tanks for later use. Each storage tank in the cycling tank array is filled one at a time using a thermoregulation process 42 to mitigate the heat generated from compression operations, while the system continuously monitors 18 the temperature, pressure, and electric current of each storage tank using sensors coupled to each tank. The heat generated during compression operations warms the compressed air and also the tank being filled. If not removed, this heat expands the air and increases its volume, partially countering the work done to compress it.

While the heat of compression is partly expelled at each compression stage, the compressed air still carries increased heat energy. To mitigate this thermal effect, the controller monitors 18 the temperatures of each storage tank in the cycling tank array. The system relies on a cycling algorithm to operate a thermoregulation process 42 that continuously rotates through the tank array to increase efficiency of the system. When the temperature of the storage tank currently being filled with air reaches a specified temperature threshold, the controller closes 42 that tank's fill valve and shifts operations to fill a cooler tank in the array 17. This allows the warmer tank to passively cool itself using ambient air as an environmental force that changes the temperature of the tank, which helps to maximize system efficiency by storing cooler air and leveraging the ambient air to cool the tanks on a continuous rotating basis. The system also pressurizes a separate boost tank 31 with high-pressure air that is used to provide a boost impulse at the beginning 32 of the energy generation process. Alternatively, the boost impulse 31 may also comprise a spring configuration that uses recoil power as a catalyst for the initiation of the air motor.

The system monitors 18 the storage tanks in the cycling tank array 17 to determine when they are full of compressed air, updating measurements of pressure, temperature, and electrical current. The results of the tank monitoring 18 are integrated 19 in the historical performance data 9 to be used in the PID algorithm 8 to refine overall operating parameters.

Figure 7:
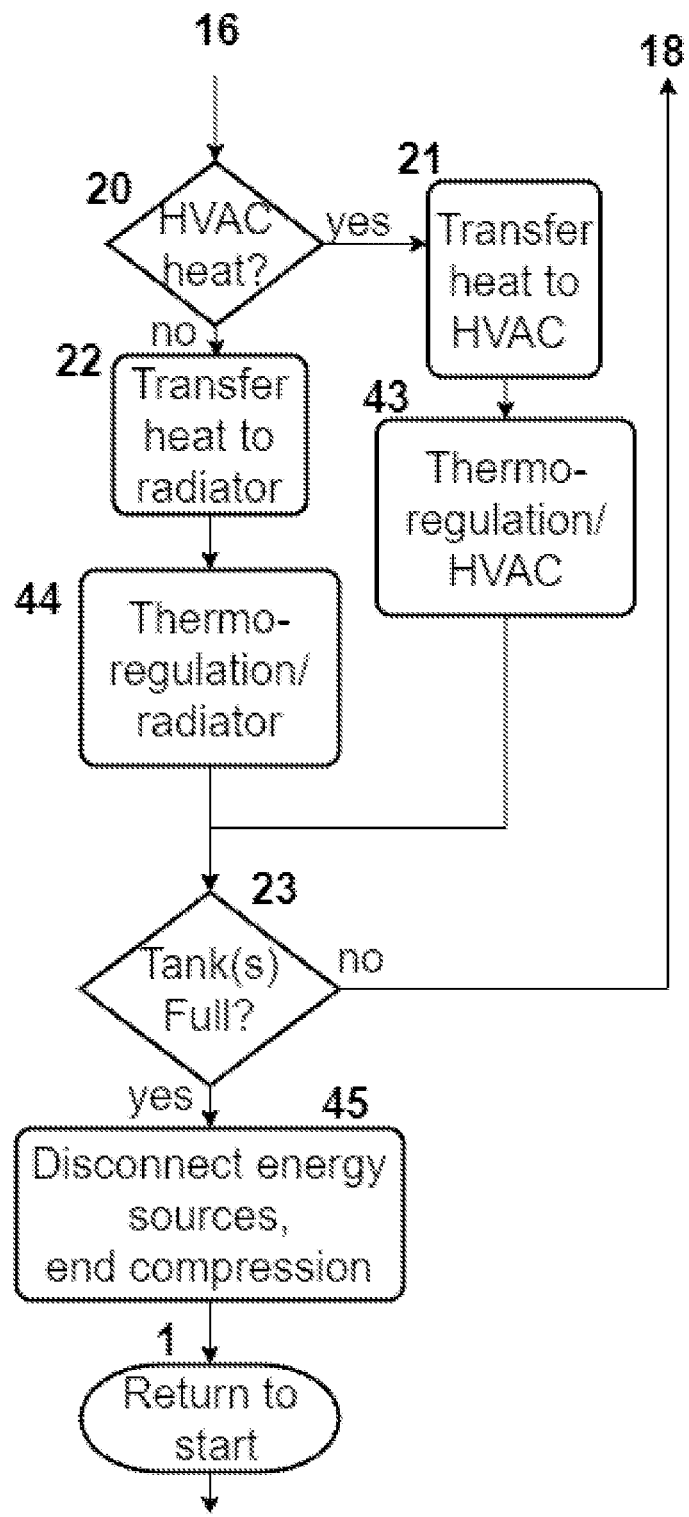
FIG. 7 illustrates the Operational Flow, Part 2.

As shown in FIG. 7, to minimize the thermal effect, the compressor radiates 21, 22 this heat into a coil of tubing filled with a circulating fluid. Using a multi-stage compression process, heat is transferred into the fluid at each compression stage. The system is connected to an HVAC system of an external building. When the system determines 20 that the HVAC system is signaling for building heat, the fluid is circulated through a heat exchanger that is coupled to the existing HVAC system of the building. The system process configures 21 valves to circulate fluid through a coil to capture waste heat from compressor operations, then circulates that liquid through the HVAC heat exchanger to transfer 43 to the building air for use as supplemental heat when needed. When the system determines 20 that supplemental heat is not needed, the system 22 configures valves to circulate fluid through a coil to capture waste heat from compressor operations, diverting the waste heat by circulating the fluid through a radiator to transfer 44 the unneeded heat to ambient air. The use 17 of an array of smaller tanks, rather than one large tank, increases the tank surface area to tank volume ratio, increasing heat transfer to ambient air and facilitating the tank cooling process. This heat transfer therefore increases the potential amount of high-pressure air that can be stored in the air storage tanks.

Once the system determines 23 that the tanks are full, the system process turns off 45 the compressor by opening the power relays between grid and/or solar panels or by disengaging the mechanical clutch at the wind turbine. The process then closes the tank fill valves and returns to the start 1.

Figure 8:
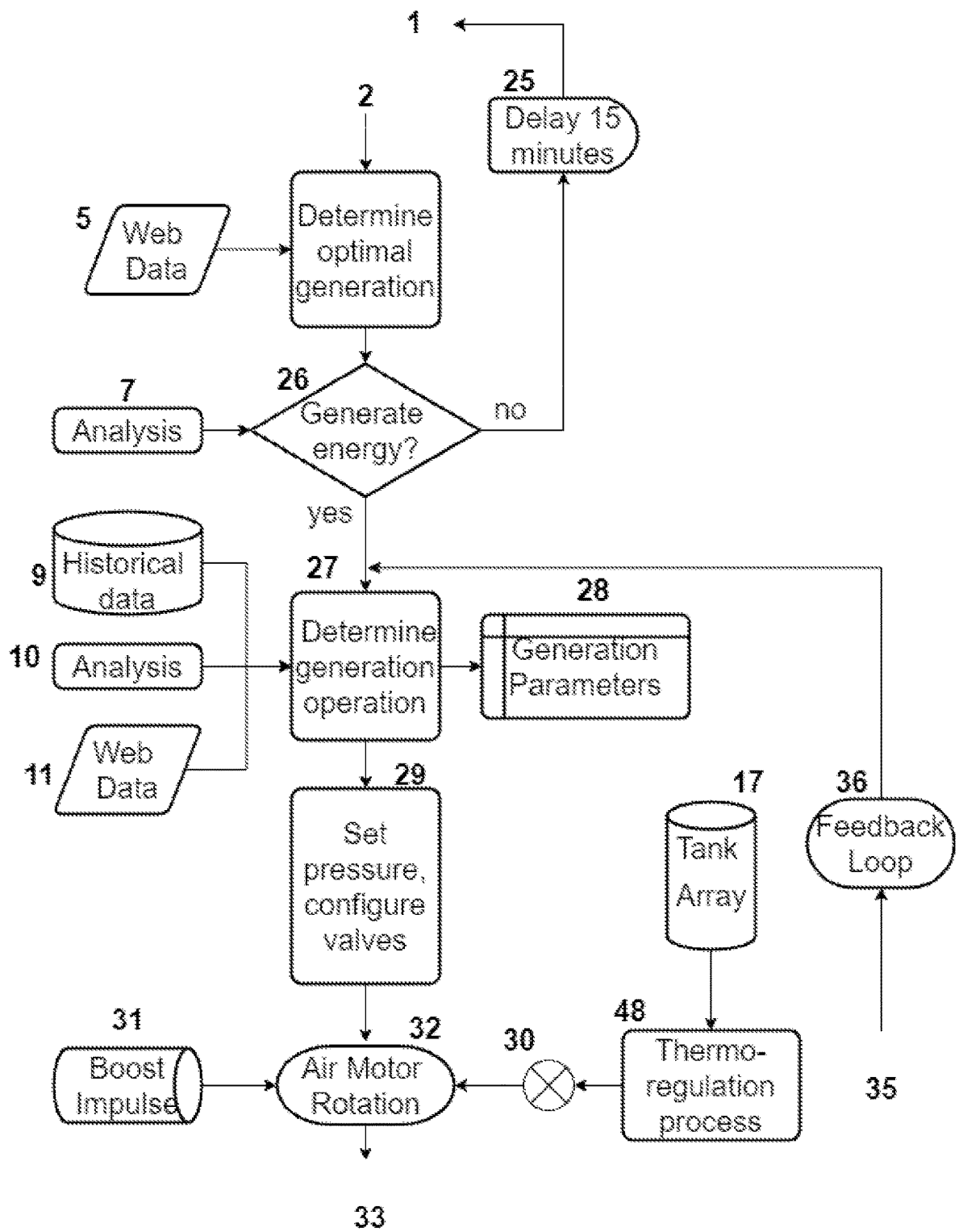
FIG. 8 illustrates the Operational Flow, Part 3.

As shown in FIG. 8, when the system determines 2 there is no excess energy available from a utility grid, a solar cell, or a wind turbine using results from CPU Analysis 3, the system operation queries 24 web data 5 to calculate upcoming demand and determine optimal energy generation. The system determines 7 whether energy should be generated 26. If no energy should be generated, the process delays 25 for a specific duration, then returns to the start 1. However, when the system determines 7 a demand for energy, it shifts to a generation process. The process uses historical performance data 9, CPU Analysis 10, and internet data 11 to continuously run 27 algorithms for machine learning, artificial intelligence, neural networks, or Proportional-Integral- Derivative (PID) control to determine optimal operating parameters 28, including optimal air pressure to maintain correct air motor rotational speed.

When the energy generation process is initiated, the at-rest air motor and connected generator 33 represent an inertial mass that must begin spinning. To overcome this at-rest inertia, the system uses the boost impulse 31, which includes releasing 29 an impulse of high-pressure air from the boost tank 31 or using a spring configuration to kick-start the air motor. When a boost tank is used, the system opens the boost tank 31 to kick-start rotation of an air motor 32. When a spring configuration is used, the system engages the spring configuration to act as the catalyst to initiate the air motor. This impulse immediately begins rotating the air motor and generator from the resting position to an operational speed. Once the air motor reached the operational speed, the high-pressured air from the cycling tank array is used to maintain this rotation from the operational speed. The system sets 29 the air tank outlet pressure regulator 30 to optimal pressure for energy generation and controls 29 the openings of the tank outlet valves to maintain rotation of the air motor 32. When the high-pressured air is released through the valves, the air motor converts 32 the high-pressured air into rotational motion using a mechanical arrangement of pistons, valves, and vanes.

As shown in FIG. 8, the air motor rotates a mechanical shaft which is connected to the generator. This rotation spins the shaft and armatures of the generator, creating electricity and effectively converting the high-pressure air back into energy. With the generation process running 33, electrical energy is delivered 34 to the desired source (microgrid, building, or utility grid) via a grid tie inverter and associated power relays. The system continuously measures 35 pressure, temperature, and electrical current. The results of those measurements are sent back 36 to be used as inputs 9 to the PID algorithm 27 to refine overall operating parameters.

As the generation process continues, the controller calculates 27 the optimum rotational speed of the air motor to meet the energy demand, based upon a variety of parameters including current energy demand 24, short-term demand forecasting 10, and historical system performance 9. These parameters are gathered from web-based information sources and from historical metrics stored in system memory.

As the high-pressure air is released through the air motor 32, it decompresses and gives up its thermal energy. This cooling effect will drop the temperature of the air motor and associated valves significantly, eventually impacting performance. Cool air has less volume, impacting efficiency. If the air temperature drops far enough, the system will begin to freeze, impacting mechanical performance. The system uses a thermoregulation process 48 to mitigate this thermal effect. The controller monitors the temperatures of each storage tank in the cycling tank array 17 and, when the temperature of the active tank currently being filled with air reaches a specified temperature threshold, the controller closes that tank and shifts operations to fill a cooler tank in the array 17, continuously rotating from cold to warm tanks. This allows the colder tank to passively warm itself using ambient air as the environmental force to maximize system efficiency. The use of an array of smaller tanks increases the overall tank surface area to tank volume ratio, increasing heat transfer from ambient air and facilitating the tank re-warming process.

Figure 9:
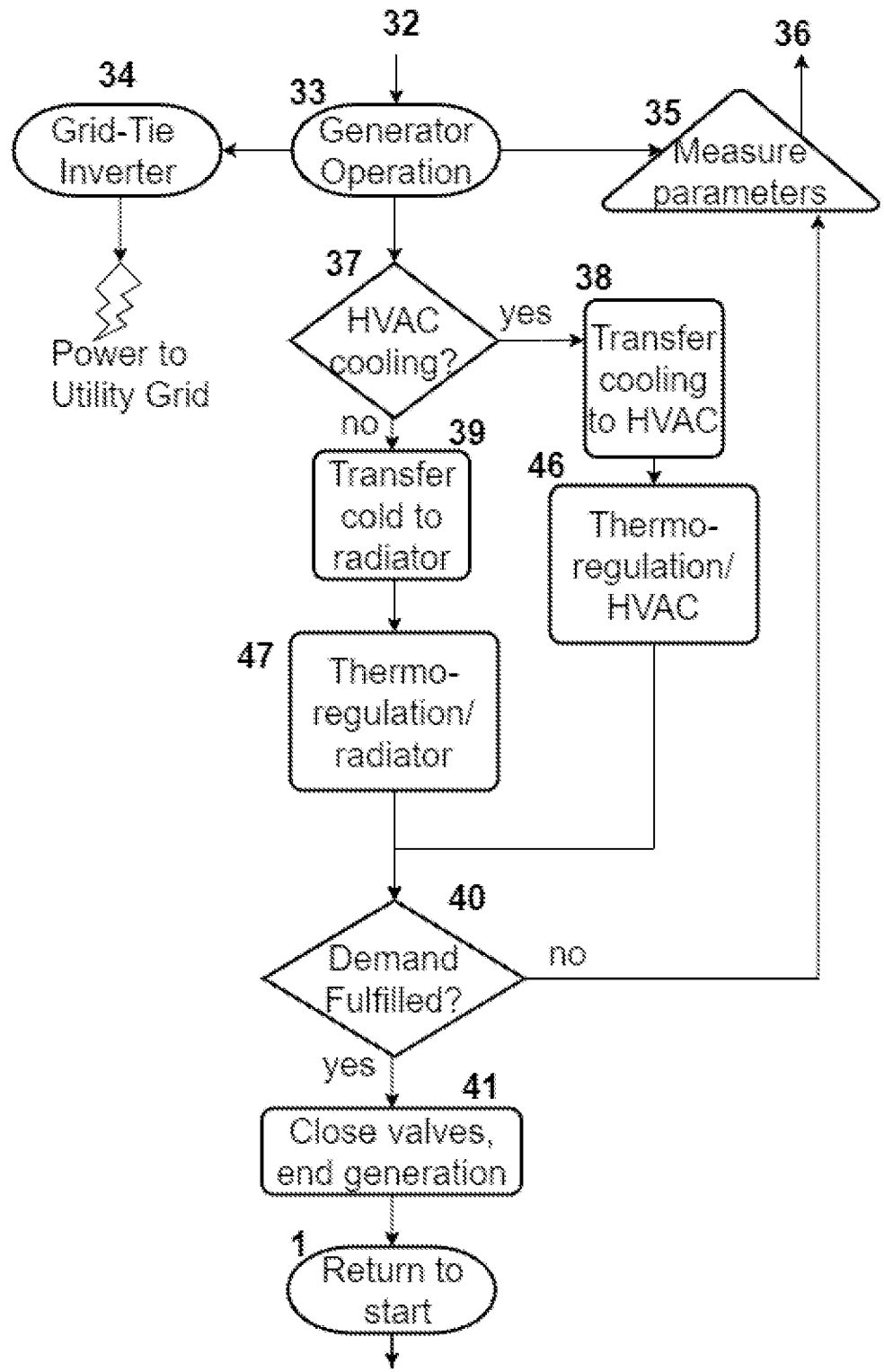
FIG. 9 illustrates the Operational Flow, Part 4.

As shown in FIG. 9, as long as the generation demand has not been fulfilled, the system updates 35 measurements of pressure, temperature, and electrical current. This data is sent back 36 to be incorporated as inputs to the control algorithm to refine overall operating parameters while the air motor rotation process 32 and generator process 33 continue. The controller commands a variable pressure air regulator valve to set the proper air pressure arriving at the air motor in order to manage 32 the optimum air motor rotational speed and therefore the optimum output 33 from the generator without wasting any system energy. In addition, a coil of tubing filled with a circulating fluid is thermally coupled to the air motor 32, capturing the cooling resulting from the air expansion. The fluid is circulated through the heat exchanger 38 that is coupled to the existing HVAC system of an external structure. While the generator is operating 33, the system determines 37 whether the building HVAC system is calling for temperature cooling. When the building needs cooling, the system configures 38 valves to circulate fluid through the coil to capture cooling from air motor air expansion, then circulates 46 that liquid through the HVAC heat exchanger to transfer this cooling energy to the building for air conditioning when needed. The system can also operate 38 valves to send compressed air 17 to a coolant compressor to directly drive the cooling system either as an assist or to operate independently without the heat exchanger. When the system determines 37 no cooling is needed, the system diverts 39 the waste cooling to an external radiator by configuring valves to circulate fluid through the coil to capture cooling from air motor expander operation, then circulates 47 that liquid through a radiator to warm the liquid from ambient air.

The system continues the generation process until it determines 40 that the generation demand has been fulfilled or until all the stored compressed air has been used. At this point, the system turns off 41 the air motor by opening the power relays and closing the tank valves and waits to begin the storage process or generation process.

System Integration

Figure 10:
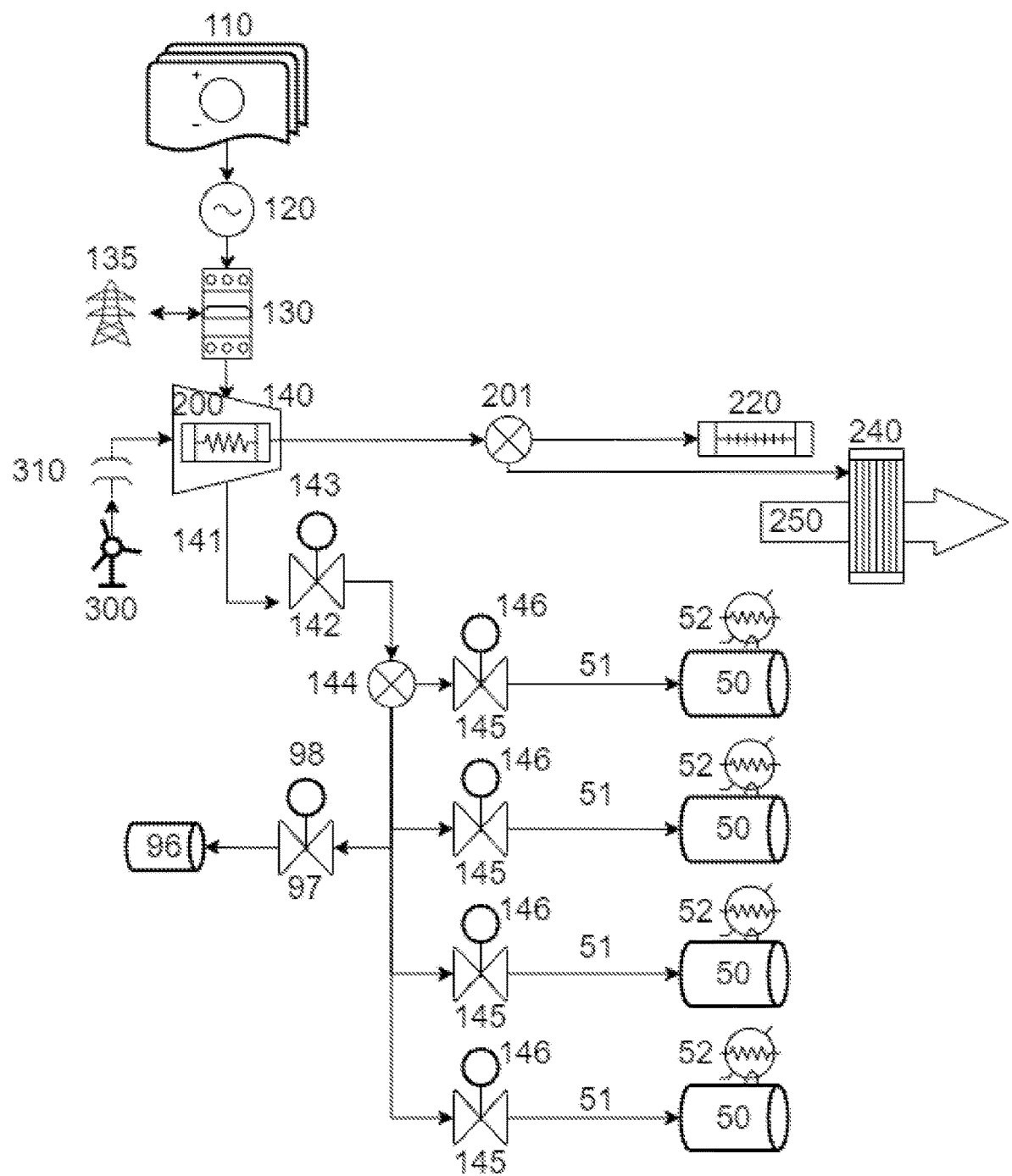
FIG. 10 illustrates the Energy Storage.

As illustrated in FIG. 10, the controller system regulates the collection of energy from energy units 110 wired to an inverter 120 that delivers energy to an AC breaker panel 130 and an electrical utility grid 135. The utility grid 135 is the existing interconnected network for delivering electricity from producers to consumers, comprising generating stations that produce electric power, electrical substations for stepping electrical voltage up for transmission or down for distribution, high voltage transmission lines that carry power from distant sources to demand-centers, and distribution lines that connect individual customers to the grid. The energy from the panel 130 charges a variable speed multi-stage compressor 140 that compresses air to the desired high-pressure range. Alternatively, a windmill 300 is mechanically coupled to the compressor 140 through a clutch 310. The clutch allows the spinning windmill 300 to directly drive the compressor 140 to minimize electrical losses that would otherwise be present.

An output air hose 141 feeds into an actuator valve 142 with a pressure sensor 143, then feeds through an inlet track section of a multi-connector 144. One of the outlet track sections is connected to at least one secondary actuator valve 145, each valve with a connected pressure sensor 146, and feeds via air hoses 51 into storage tanks 50 equipped with temperature sensors 52. The output air hose 141 may also feed a boost tank 96 through the multi-connector 144 and an actuator valve 97 with a pressure sensor 98.

The boost impulse 96 comprises an apparatus that acts as a catalyst for kick-starting the air motor from a resting position to an operating speed. Once the air motor is running at the desired operational speed, the boost impulse ceases and the operation of the air motor is subsequently taken over by the cycling tank array. When an auxiliary boost tank is used as the boost impulse, the boost tank provides a short release of pressurized air for the start-up of energy generation. This pulsation kickstarts an expander and mechanically coupled generator, using the pulse to overcome mechanical at-rest inertia without depleting air in the cycling tank array 50. The boost tank 96 is quickly recharged at the beginning of each storage cycle, as needed, by air pressure from the compressor 140 through the multi-connector 149. The boost impulse may also be comprised of a spring apparatus that uses a recoil power as the catalyst for the air motor to reach the operational speed.

A heat exchanger coil 200 gathers waste heat from the compressor 140 using a circulating liquid, which is sent to a valve 201 that directs the heated liquid to an HVAC heat exchanger 240. Circulating air 250 from the building's HVAC system captures this heat from the heat exchanger 240. This otherwise wasted heat is used to heat the building. When building heat is not needed, the valve 201 directs the heated liquid to a radiator 220 that radiates the excess heat to ambient air.

Figure 11:
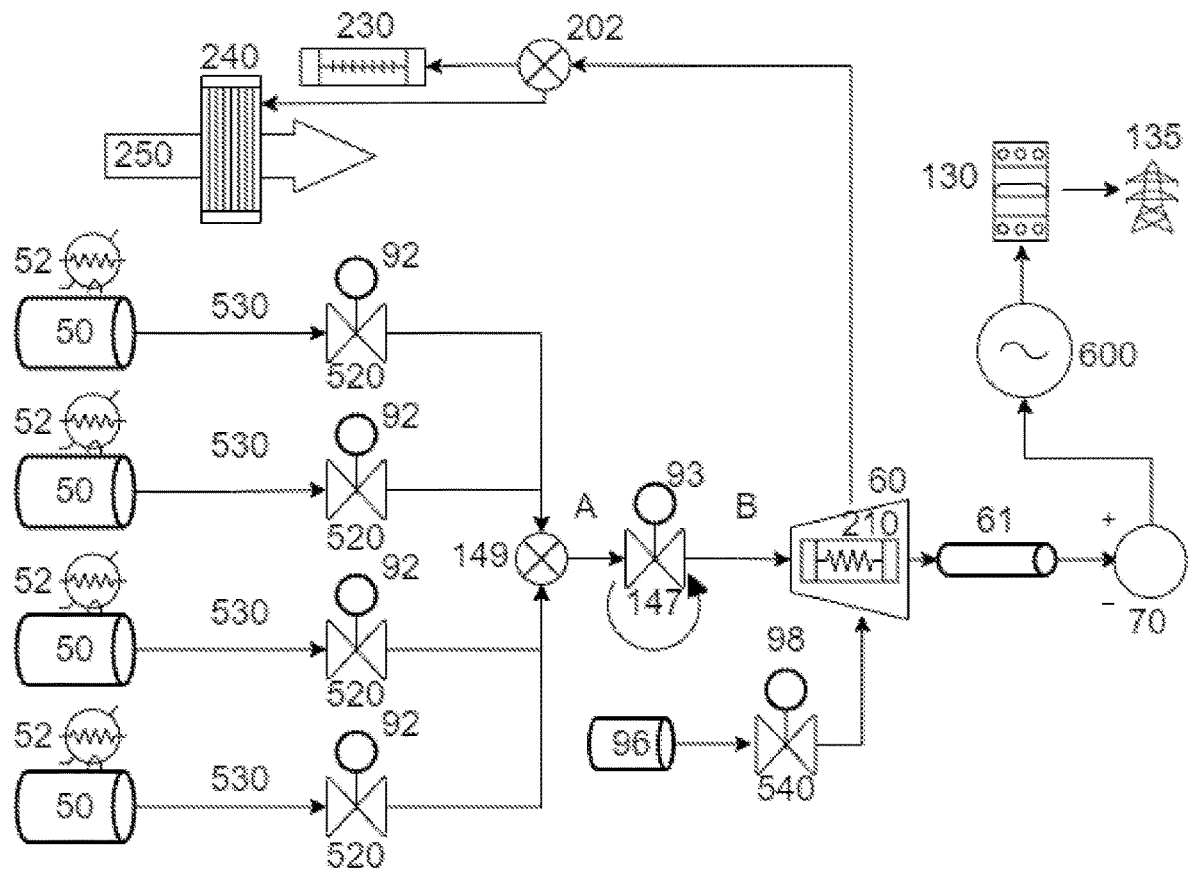
FIG. 11 illustrates the Energy Generation.

As illustrated in FIG. 11, energy generation is also managed by the controller system to regulate the production of energy. The compressed air in the storage tanks 50 is released through second actuator valves 520 via air hoses 530 with the high-pressure output feeding through the multi-connector 149. The output hose at the multi-connector 149 directs the high-pressured air at A into a variable pressure regulator 147 with a sensor 93, transmitting the air at a variable low pressure B into an expander 60. The shaft of the expander is connected via a flexible coupling 61 to an electric generator 70. At the beginning of a generation cycle, the controller initiates the boost impulse to kick start the expander 60 and generator 70. This kick-start overcomes the at-rest mechanical inertia of the expander and generator. Once the expander and generator are spinning, the rotation is maintained with optimized air pressure from the cycling tank array 50. The generator is wired to return power to the AC breaker panel 130 and electrical utility grid 135. When a boost tank of high-pressured air is used, the controller momentarily opens an actuator valve 540 of the boost tank 96 equipped with a pressure sensor 98 to provide a pulse of pressurized air in order to start up the expander. Alternatively, the controller may actuate a spring configuration to provide startup power for the expander.

A heat exchanger coil 210 gathers waste cooling from the air motor 60 using a circulating liquid that is sent to a valve 202. When the building associated with the system is cooling its interior, the valve 202 directs the cooled liquid to the heat exchanger 240. Circulating air 250 from the building's existing HVAC system captures this cooling from the heat exchanger 240, and this otherwise wasted cooling is used to help cool the building. When building cooling is not needed, the valve 202 directs the heated liquid to a radiator 230, which radiates the excess cooling to ambient air. Additionally, compressed air can be used to directly drive a coolant compressor to be used in combination with the heat exchanger or independently.

Figure 12:
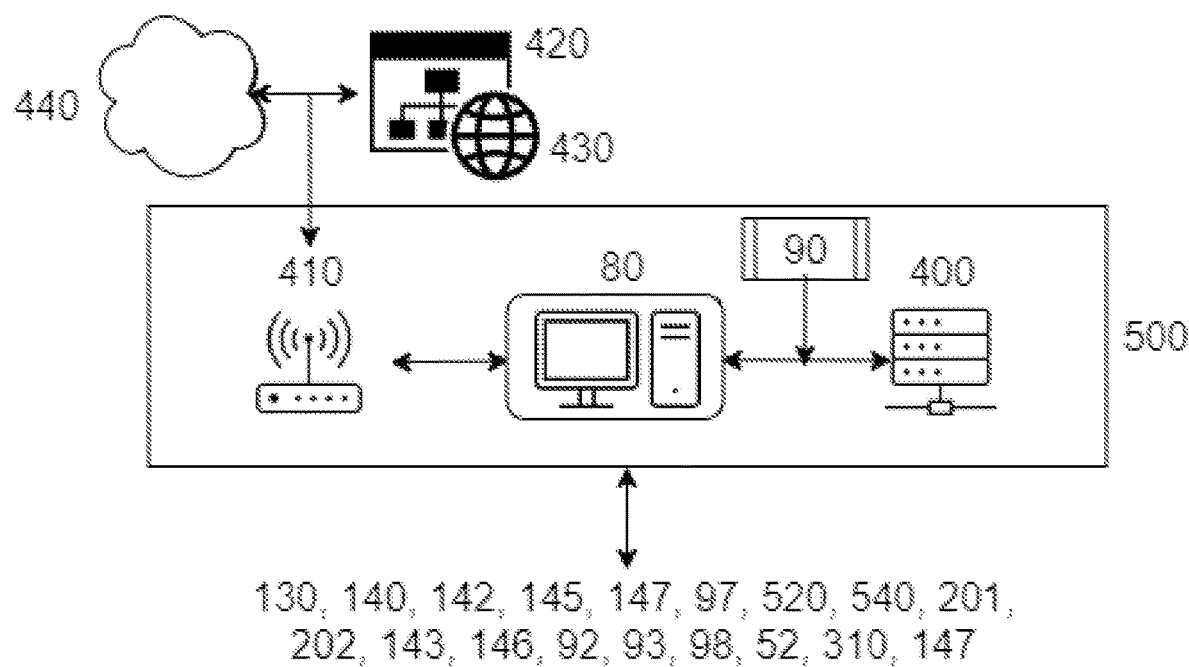
FIG. 12 illustrates the Controller System.

As shown in FIG. 12, the system operation is managed by a controller system 500 comprising a central processing unit (CPU) 80, programmable logic controllers (PLC) 400, an automated control program 90, and a Wireless Internet Gateway 410 that interfaces with multiple web data sources 420 using the internet 430 and specific cloud servers 440. The controller continuously monitors parameters related to the existing and anticipated availability of energy and the existing and anticipated demand for energy for the current 24 to 48 hours. These parameters include web-based information such as weather forecasts, utility grid energy pricing, curtailment data, and utility forecasting. Energy sources include excess utility grid energy and energy from renewable sources, including solar and wind. Supply and demand forecasting is implemented using internet-based web data sources queried by the controller 500. These sources include current supply and demand data, forecasted supply and demand, supply and demand trends, current market pricing and pricing trends, curtailment data, and current and forecasted weather. The controller 500 combines this data with historical system performance data and determines a suitable system performance using tailored algorithms for machine learning, artificial intelligence, neural networks, and PID control to continually optimize the overall system operation for maximum efficiency and power generation. The algorithms are specifically directed toward minimizing the energy-loss effects of diabatic cooling during power generation by automatically switching from the air tanks cooled by air decompression to warmer air tanks based on a temperature comparison. This cycling allows the colder air tanks to warm via ambient air energy before being called upon to deliver compressed air to an air motor, thereby increasing the efficiency of energy generation.

The controller system 500 is wired to the breaker panel 130, the compressor 140, the actuator valves 142, 145, 97, 520, 540, 201, 202, the pressure sensors 143, 146, 92, 93, 98, the temperature sensors 52, the clutch 310, and the variable pressure regulator 147. The controller 500 is directed by a user-input demand schedule or a pre-programmed default automated control program 90 generated either on-site or at a remote location. It controls the energy storage and the output of production to reshape the distribution of energy supply to the distribution of the demand/supply schedule in order to maintain a balanced system. The controller 500 is also wired to the panel 130 to receive data used to evaluate what is needed based on the forecasted schedule 90 to determine when to store collected energy, when to release it, and the rates needed to meet the desired power production.

The controller 500 uses the results of the system algorithms to determine optimal performance. The controller decides whether to do nothing or to store or generate energy, determines how quickly to store or generate energy, and manages air tank temperatures. For energy generation, the controller uses the algorithm results to select a proper air pressure using the variable air pressure regulator 147, which enables the system to modulate the power generation rate in order to closely match the actual demand load without wasting stored energy (compressed air). During power generation, the controller 500 also shifts air valves to draw compressed air from specific tanks within the cycling tank array 50 on a rotating basis in order to keep air driving the motor 60 at a more constant temperature and mitigate any undesired effects of expansion cooling in a typical diabatic system. In this manner, the system is able to maintain a more constant operating air temperature by constant heat exchange from the environment, approximating constant temperature of an isothermal system.

The controller 500 is a robust, fault tolerant combination of a CPU, web access gateway via cellular technology, and a PLC that embodies a standard, well-proven industrial digital computer specifically designed for this control system. The CPU contains a monitoring and analysis program that gathers data from web sources and compares the data with historical performance data to decide when to store energy and when to generate electricity. The CPU updates the data and its resulting decision with specified frequency. The CPU monitors operating parameters of the system in real time, including air pressure at various points, temperature at various points, voltage and current at various points, and ambient air temperature.

When a decision is made to store or generate energy, the CPU runs a control algorithm to optimize the overall system performance. The algorithm is a control-loop mechanism employing feedback via a variety of pressure, temperature, and electrical sensors to optimize overall system performance and keep the performance within the desired parameter limits. The control algorithm continuously calculates an error value for pressure, temperature, and electrical parameters, as the difference between measured values and desired setpoints. The algorithm then applies an appropriate correction by varying voltage, current, or air pressure based upon proportional, integral, and derivative terms that are calculated from measured values and historical performance data. The proportional value represents the current measured error value for a particular parameter, the integral value accounts for past values of the error for a particular parameter by integrating over time, and the derivative value is an estimate of the future trend of the error value for a particular parameter calculating the derivative rate-of-change of that value.

The three algorithm coefficients are continuously combined mathematically to calculate optimal operating parameters for voltage, current, and air pressure in order to maintain optimal overall system performance and to adjust respective controlled devices if the parameters deviate from their desired setpoints. When a correction is necessary, the control algorithm selects the minimal change to drive desired behavior without overshooting a parameter. This feedback control system helps to optimize overall system performance, and therefore system efficiency, and minimizes wear and tear on system components to maximize system reliability.

The control algorithm is used during the energy storage phase to decide how quickly to compress air and fill the cycling tank array. This rate of storage varies based upon available renewable energy, the time window that the energy will be available, and the optimal operating parameters of the compressor. The control algorithm is used during the energy generation phase to direct the proper start-up and ramp of the air motor via boost impulse and air pressure regulation to conserve air pressure as much as possible. The algorithm then varies the air pressure to keep the air motor within the optimal RPM (revolutions per minute) band, thereby maintaining constant generator speed. This approach optimizes overall power generation while conserving as much air pressure as possible.

Grid-tie inverters 600 shown in FIG. 11 are normally 120 V RMS (root-mean-square, a standard measure of effective AC voltage) at 60 Hz or 240 V RMS at 60 Hz, and used between electrical power generators, including solar panel, wind turbine, hydro-electric, and the utility power grid 135. To inject electrical power efficiently and safely into the grid 135, the grid-tie inverter 600 accurately matches the voltage and phase of the grid sine wave AC waveform. The electrical power grid 135 is the existing interconnected network for delivering electricity from producers to consumers, comprising generating stations that produce electric power, electrical substations for stepping electrical voltage up for transmission or down for distribution, high voltage transmission lines that carry power from distant sources to demand-centers, and distribution lines that connect individual customers to the grid. During energy generation, the system essentially becomes a supplemental generating station for the overall grid 135, replacing the solar or wind or higher priced energy that is no longer available or decreased due to lack of sun, wind, or desirability.

The invention claimed is:

1. An energy management machine comprising:
   at least one control component;
   at least one monitoring component configured to generate performance data;
   an air compression device coupled to at least one said control component and configured to receive energy from at least one energy source to create a volume of high-pressured air from an ambient air source;
   a cycling tank array comprising at least two storage tanks, such that each storage tank is coupled to at least one said monitoring component, at least one said control component, and said air compression device, and configured to receive a volume of high-pressured air from said air compression device;
   a fill order component coupled to at least one said control component, and comprising a first cycling algorithm configured to determine which storage tank receives a portion of high-pressured air based on said performance data;
   a release order component coupled to at least one said control component, and comprising a second cycling algorithm configured to determine which storage tank releases the portion of high-pressured air based on said performance data;
   an air motor coupled to at least one said control component and said cycling tank array;
   a generator coupled to at least one said control component and said air motor;
   a boost impulse component coupled to at least one said control component, said air compression device, and said air motor;
   a distribution apparatus connected to at least one said control component, said generator, and an electrical power grid;
   a controller connected to at least one said control component and an internet source, said controller comprising: a processing component that determines future energy demand; a machine learning component that determines a continuum of optimal operating parameters; a performance component that determines when to capture energy, when to store energy, and when to generate energy; an integration component that incorporates said continuum of optimal operating parameters to control at least one said control component and at least one said monitoring component; and wherein said controller is configured to direct a volume of high-pressured air from said cycling tank array to directly drive a coolant compressor.

2. The energy management machine according to claim 1, further comprising a heat exchanger coupled to the controller and configured to receive a volume of captured heat created by the air compression device and a volume of cooling created by electrical energy generation, wherein said controller leverages the captured heat and cooling to improve performance and conservation of heating and cooling operations of an external building.

3. The energy management machine according to claim 2, wherein at least one control component comprises an actuator valve and a pressure regulator.

4. The energy management machine according to claim 3, wherein at least one monitoring component comprises a temperature sensor and a pressure sensor.

5. The energy management machine according to claim 4, wherein the boost impulse component comprises a vessel configured to receive a second volume of high-pressured air from the air compression device to initiate the air motor from a resting position to reach an operational speed and to discontinue once the air motor reaches said operational speed.

6. The energy management machine according to claim 4, wherein the boost impulse component comprises a spring apparatus configured to initiate the air motor.

7. The energy management machine according to claim 4, wherein at least one energy source comprises a solar cell, a wind turbine, or an electrical utility grid.

8. The energy management machine according to claim 7, wherein the wind turbine comprises a mechanically-coupled transmission operable to convey rotational energy from a multiple of wind vanes within the wind turbine directly to compress ambient air for storage into the cycling tank array.

9. The energy management machine according to claim 4, wherein at least one energy source is an electrical utility grid and wherein the controller further comprises: a cost analysis algorithm that directs the capture of energy from the energy source when the energy is assessed an initial rate and the distribution of electrical energy when the energy is assessed at a subsequent rate that is higher than the initial rate.

10. An energy management machine comprising:
at least one control component;
at least one monitoring component configured to generate performance data;
an air compression device coupled to at least one said control component and configured to receive energy from at least one energy source to create a volume of high-pressured air from an ambient air source;
a cycling tank array comprising at least two storage tanks, such that each storage tank is coupled to at least one said monitoring component, at least one said control component, and said air compression device and configured to receive a volume of high-pressured air from said air compression device;
a fill order component coupled to at least one said control component, and comprising a first cycling algorithm configured to determine which storage tank receives a portion of high-pressured air based on said performance data;
a release order component coupled to at least one said control component, and comprising a second cycling algorithm configured to determine which storage tank releases the portion of high-pressured air based on said performance data;
an air motor coupled to at least one said control component and said cycling tank array;
a generator coupled to at least one said control component and said air motor;
a boost impulse component coupled to at least one said control component, said air compression device, and said air motor;
a distribution apparatus connected to at least one said control component, said generator, and an electrical power grid;
a controller connected to at least one said control component and an internet source, said controller comprising: a processing component that determines future energy demand; a machine learning component that determines a continuum of optimal operating parameters; a performance component that determines when to capture energy, when to store energy, and when to generate energy; and an integration component that incorporates said continuum of optimal operating parameters to control at least one said control component and at least one said monitoring component; and
a heat exchanger coupled to the controller and configured to receive a volume of captured heat created by the air compression device and a volume of cooling created by electrical energy generation, wherein said controller leverages the captured heat and cooling to improve performance and conservation of heating and cooling operations of an external building.

11. The energy management machine according to claim 10, wherein the boost impulse component comprises a vessel configured to receive a second volume of high-pressured air from the air compression device to initiate the air motor from a resting position to reach an operational speed and to discontinue once the air motor reaches said operational speed.

12. The energy management machine according to claim 11, wherein at least one energy source is an electrical utility grid and wherein the controller further comprises: a cost analysis algorithm that directs the capture of energy from the energy source when the energy is assessed an initial rate and the distribution of electrical energy when the energy is assessed at a subsequent rate that is higher than the initial rate.

13. A method of managing energy generation, the method comprising the steps of:
operating a controller to obtain information from an internet source, wherein the information includes energy supply and demand data, energy cost data, curtailment data, and weather data;
capturing energy from at least one energy source;
using the captured energy to compress ambient air into a volume of high-pressured air;
storing the high-pressured volume of air in a cycling tank array comprising at least two storage tanks such that the storage tanks are filled one at a time according to a fill order;
monitoring the temperature and pressure values of each storage tank, wherein the temperature of each storage tank is changed by an environmental force;
determining the fill order based on the lowest temperature and the lowest pressure of each storage tank within the cycling tank array;
determining a release order for the cycling tank array based on the highest temperature and the highest pressure of each storage tank within the cycling tank array;
filling each storage tank with the high-pressured air according to the fill order and releasing the high-pressured air from each storage tank one at a time according to the release order;
operating a boost impulse to initiate an air motor from a resting position to an operational speed and discontinuing the boost impulse once the air motor reaches the operational speed;
once the air motor reaches the operational speed, controlling the release of the high-pressured air from the cycling tank array to operate the air motor coupled to a generator to create a quantity of electrical energy;
deriving performance data from a system monitoring process;
analyzing said information from an internet source to calculate future energy demand data;
using machine learning algorithms to process the future energy demand data with the performance data to determine a continuum of optimal operating parameters;

integrating the continuum of optimal operating parameters to determine when to capture energy, when to store energy, and when to generate energy;

controlling the distribution of the quantity of electrical energy to an electrical power grid; and controlling a volume of high-pressured air from said cycling tank array to directly drive a coolant compressor.

14. The method of managing energy generation according to claim 13, further comprising a heat exchanger coupled to the controller for receiving a volume of captured heat created by the air compression device and a volume of cooling created by electrical energy generation, wherein said controller leverages the captured heat and cooling to improve performance and conservation of heating and cooling operations of an external building.

15. The method of managing energy generation according to claim 14, wherein the boost impulse comprises a vessel configured to receive a second volume of high-pressured air to initiate the air motor from the resting position to reach an operational speed and to discontinue once the air motor reaches the operational speed.

16. The method of managing energy generation according to claim 14, wherein the boost impulse comprises a spring apparatus configured to initiate the air motor.

17. The method of managing energy generation according to claim 14, wherein at least one energy source comprises an electrical utility grid, a solar cell, or a wind turbine.

18. The method of managing energy generation according to claim 17, wherein the wind turbine comprises a mechanically-coupled transmission operable to convey rotational energy from a multiple of wind vanes within the wind turbine directly to compress ambient air for storage into the cycling tank array.

19. The method of managing energy generation according to claim 14, wherein at least one energy source is an electrical utility grid and wherein the controller further comprises: a cost analysis algorithm that directs the capture of energy from the energy source when the energy is assessed an initial rate and the distribution of electrical energy when the energy is assessed at a subsequent rate that is higher than the initial rate.

20. The method of managing energy generation according to claim 19, wherein the environmental force is a thermal equilibrium force.

\* \* \* \* \*